US012695377B2

(12) United States Patent
Tang et al.

(10) Patent No.: US 12,695,377 B2
(45) Date of Patent: Jul. 28, 2026

(54) SWITCHING CONVERTER DEADTIME CONTROL

(71) Applicant: Texas Instruments Incorporated, Dallas, TX (US)

(72) Inventors: Hua Tang, Shenzhen (CN); Xuemei Lu, ChongQing (CN); Zhaofu Zhou, ChongQing (CN); Pengcheng Ban, Guangzhou (CN); Yubo Wang, Shenzhen (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 232 days.

(21) Appl. No.: 18/427,937

(22) Filed: Jan. 31, 2024

(65) Prior Publication Data

US 2025/0246995 A1     Jul. 31, 2025

(51) Int. Cl.
*H02M 1/38*          (2007.01)
*H02M 3/335*         (2006.01)
(52) U.S. Cl.
CPC ....... *H02M 1/385* (2021.05); *H02M 3/33592* (2013.01)
(58) Field of Classification Search
CPC .......................... H02M 1/385; H02M 3/33592
See application file for complete search history.

(56) References Cited

U.S. PATENT DOCUMENTS

| | | | | |
|---|---|---|---|---|
| 6,279,097 | B1 | 8/2001 | Kaku | |
| 10,256,744 | B2 * | 4/2019 | Yu ...................... | H02M 3/33553 |
| 10,797,606 | B2 * | 10/2020 | Mayell .............. | H02M 3/33515 |
| 2001/0026230 | A1 | 10/2001 | Toyokura | |
| 2025/0080003 | A1 * | 3/2025 | Chen ................... | H02M 1/0058 |

OTHER PUBLICATIONS

Everts, Jordi, et al: "Optimal ZVS Modulation of Single-Phase Single-Stage Bidirectional DAB AC-DC Converters," IEEE Transactions on Power Electronics, Institute of Electrical and Electronics Engineers, USA, vol. 29, No. 8, Aug. 1, 2014 (Aug. 1, 2014), pp. 3954-3970, XP011544117, ISSN: 0885-8993.
International Search Report mailed Apr. 23, 2025.

* cited by examiner

*Primary Examiner* — Adolf D Berhane
(74) *Attorney, Agent, or Firm* — Frank D. Cimino

(57) ABSTRACT

A circuit includes a controller configured to control switching of a first transistor and a second transistor in switching converter. The controller includes a compensation loop and a deadtime circuit. The compensation loop is configured to provide a compensation value. The deadtime circuit is configured to determine a deadtime value based on the compensation value. The deadtime value defines an interval between turn-off of the first transistor and turn-on of the second transistor.

20 Claims, 5 Drawing Sheets

602 — PROVIDE DEADTIME LOOKUP TABLE

604 — CALCULATE COMPENSATION VALUE

606 — RIGHT SHIFT COMPENSATION VALUE

608 — APPLY SHIFTED COMPENSATION VALUE TO ADDRESS DEADTIME LOOKUP TABLE

610 — RETRIEVE DEADTIME VALUE FROM DEADTIME LOOK UP TABLE

612 — GENERATE CONTROL PULSES BASED ON THE DEADTIME VALUE

614 — APPLY CONTROL PULSES TO TURN ON/OFF SWITCHING TRANSISTORS

SWITCHING CONVERTER DEADTIME CONTROL

BACKGROUND

A DC-DC converter is an electronic circuit that converts an input direct current (DC) voltage into one or more DC output voltages that are higher or lower in magnitude than the input DC voltage. A DC-DC converter that generates an output voltage lower than the input voltage is termed a buck or step-down converter. A DC-DC converter that generates an output voltage higher than the input voltage is termed a boost or step-up converter.

Some DC-DC converter topologies include a drive/power switch coupled at a switch node to an energy storage inductor/transformer. Electrical energy is transferred through the energy storage inductor/transformer to a load by alternately opening and closing the switch as a function of a switching signal. The amount of electrical energy transferred to the load is a function of the ON/OFF duty cycle of the switch and the frequency of the switching signal DC-DC converters are widely used in electronic devices, particularly battery powered devices, such as portable cellular phones, laptop computers, and other electronic systems in which efficient use of power is desirable.

SUMMARY

In one example, a circuit includes a controller configured to control switching of a first transistor and a second transistor in switching converter. The controller includes a compensation loop and a deadtime circuit. The compensation loop is configured to provide a compensation value. The deadtime circuit is configured to determine a deadtime value based on the compensation value. The deadtime value defines an interval between turn-off of the first transistor and turn-on of the second transistor.

In another example, a method includes calculating a compensation value in a compensation loop of a switching converter. The method also includes calculating a deadtime value based on the compensation value, the deadtime value defining an interval between turn-off of a first transistor and turn-on of a second transistor of the switching converter. The method further includes applying the deadtime value to control switching of the first transistor and the second transistor.

In a further example, a switching converter includes a first transistor, a second transistor, and a controller. The first transistor and the second transistor are coupled in series. The controller is coupled to the first transistor and the second transistor. The controller includes a compensation loop and a deadtime circuit. The compensation loop is configured to provide a compensation value. The deadtime circuit is configured to determine a deadtime value based on the compensation value. The deadtime value defines an interval between turn-off of the first transistor and turn-on of the second transistor.

BRIEF DESCRIPTION OF THE DRAWINGS

FIG. 2 is a graph of example transistor control signals, including deadtime, generated in the phase shift full bridge converter circuit of FIG. 1.

DETAILED DESCRIPTION

Figure 1:
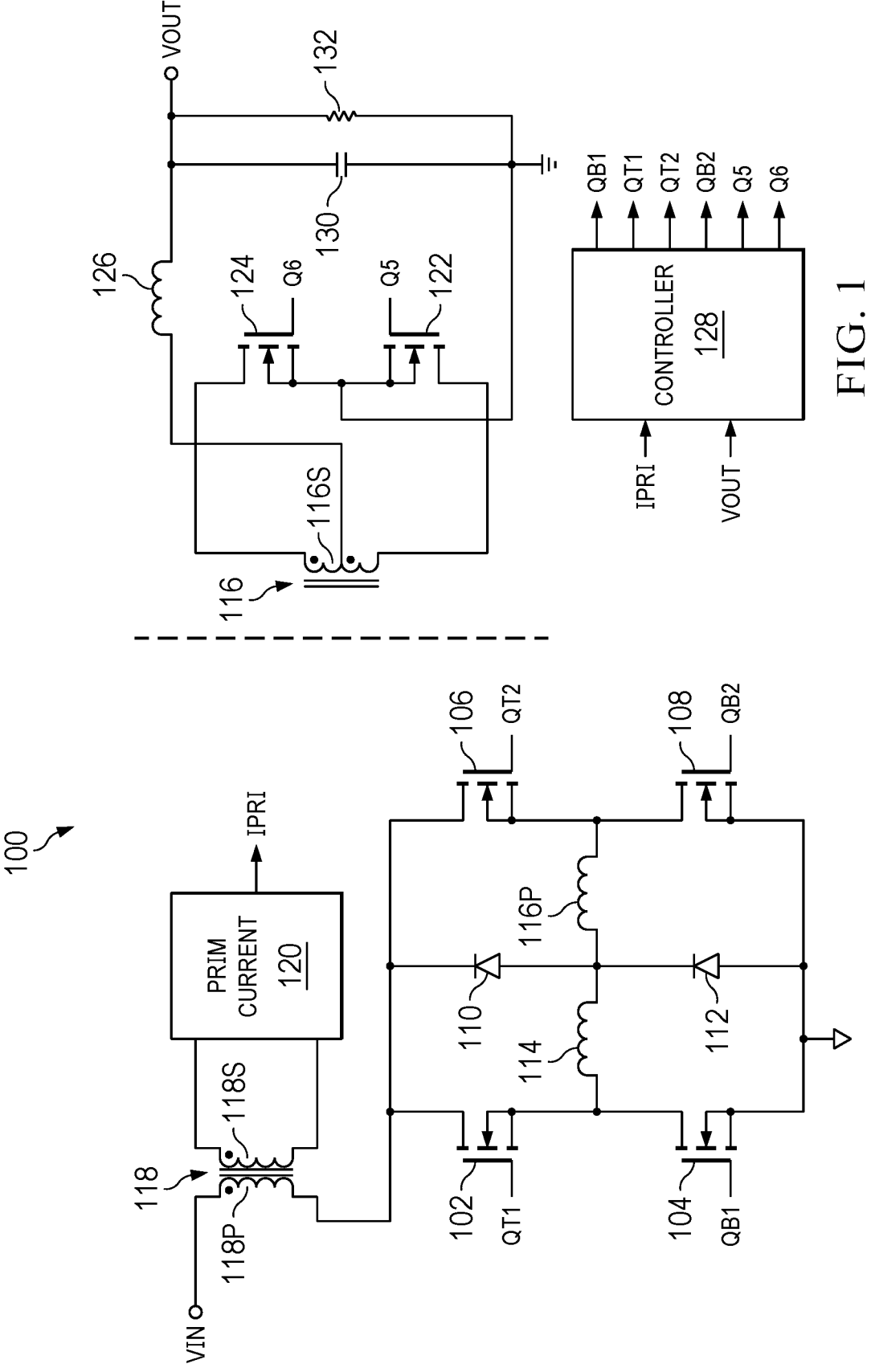
FIG. 1 is a block diagram of an example phase shift full bridge converter circuit.

FIG. 1 is a block diagram of an example phase shift full bridge converter circuit 100. The phase shift full bridge converter circuit 100 includes transistors 102, 104, 106, 108, 122, and 124, diodes 110 and 112, inductors 114 and 126, transformers 116 and 118, a primary current circuit 120, a controller 128, and a capacitor 130. The transistors 102, 104, 106, 108, 122, and 124 may be n-type field effect transistors. The transistors 102, 104, 106, and 108 are coupled as a full bridge. A first current terminal (e.g., drain) of the transistor 102 is coupled to a first current terminal (e.g., drain) of the transistor 106. A second current terminal (e.g., source) of the transistor 102 is coupled to a first current terminal (e.g., drain) of the transistor 104 at a first switching node. A second current terminal (e.g., source) of the transistor 106 is coupled to a first current terminal (e.g., drain) of the transistor 108 at a second switching node. A second current terminal (e.g., source) of the transistor 108 is coupled to a second current terminal (e.g., source) of the transistor 104 and a reference voltage terminal (e.g., ground).

The transformer 118 includes a primary coil 118P and a secondary coil 118S. A first terminal of the primary coil 118P is coupled to a power terminal VIN, and a second terminal of the primary coil 118P is coupled to the first current terminal of the transistor 102. The first and second terminals of the secondary coil 118S are coupled to the primary current circuit 120. The primary current circuit 120 senses the current flowing through the primary coil 118P and provides a signal (IPRI) that is representative of the sensed current flowing through the primary coil 118P.

A cathode of the diode 110 is coupled to the first current terminal of the transistor 102. An anode of the diode 110 is coupled to the cathode of the diode 112. An anode of the diode 112 is coupled to the second current terminal of the transistor 104. A first terminal of the inductor 114 is coupled to the second terminal of the transistor 102, and a second terminal of the inductor 114 is coupled to the anode of the diode 110. The transformer 116 includes a primary coil 116P and a secondary coil 116S. A first terminal of the primary coil 116P is coupled to the anode of the diode 110, and a second terminal of the primary coil 116P is coupled to the second current terminal of the transistor 106.

The transistors 122 and 124 are configured as synchronous rectifiers. A first current terminal (e.g., drain) of the transistor 124 is coupled to a first terminal of the secondary coil 116S. A first current terminal (e.g., drain) of the transistor 122 is coupled to a second terminal of the secondary coil 116S. A second current terminal (e.g., source) of the transistor 124 is coupled to a second current terminal (e.g., source) of the transistor 122 and a reference voltage terminal (e.g., ground). The inductor 126 is coupled between a center tap terminal of the transformer 116 and a voltage output terminal (VOUT). The capacitor 130 is coupled between the voltage output terminal and the reference voltage terminal to filter the output voltage. A load resistor 132 is also coupled between the voltage output terminal and the reference voltage terminal. The load resistor 132 may not be a component of the phase shift full bridge converter circuit 100, but may represent a load circuit that is powered by the phase shift full bridge converter circuit 100.

The controller 128 controls the switching of the transistors 102, 104, 106, 108, 122, and 124. In some implementations of the phase shift full bridge converter circuit 100, the controller 128 may control switching based on IPRI and the voltage at VOUT. A first input of the controller 128 is coupled to the output of the primary current circuit 120 for receipt of IPRI, and a second terminal of the controller 128 is coupled to VOUT. The controller 128 has outputs 1-6 for providing transistor control signals QT1, QB1, QB2, QT2, Q5, and Q6. A control terminal (e.g., gate) of the transistor 102 is coupled to the first output of the controller 128 for receipt of the control signal QT1. A control terminal (e.g., gate) of the transistor 104 is coupled to the second output of the controller 128 for receipt of the control signal QB1. A control terminal (e.g., gate) of the transistor 106 is coupled to the third output of the controller 128 for receipt of the control signal QT2. A control terminal (e.g., gate) of the transistor 108 is coupled to the fourth output of the controller 128 for receipt of the control signal QB2. A control terminal (e.g., gate) of the transistor 122 is coupled to the fifth output of the controller 128 for receipt of the control signal Q5. A control terminal (e.g., gate) of the transistor 124 is coupled to the sixth output of the controller 128 for receipt of the control signal Q6.

Figure 2:
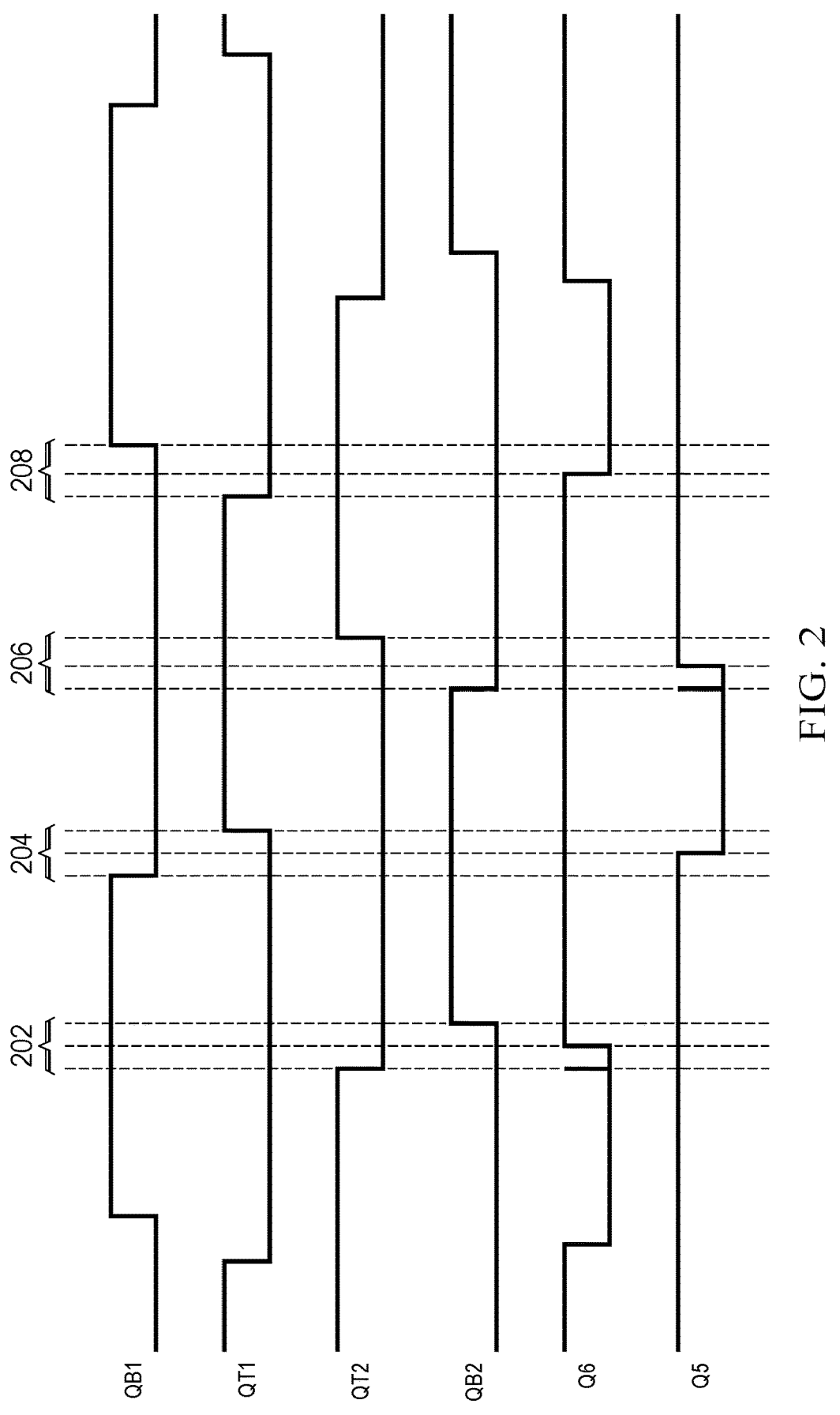

FIG. 2 is a graph of example transistor control signals QT1, QB1, QB2, QT2, Q5, and Q6 generated by the controller 128. FIG. 2 shows that the controller 128 generates the transistor control signals QT1, QB1, QB2, QT2, Q5, and Q6 such that edges of the control signal are separated by a selected time (a deadtime). For example, in the interval 202, Q6 transitions at a rising edge from a first state to a second state a deadtime after QT2 transitions at a falling edge from the second state to the first state, and QB2 transitions at a rising edge from the first state to the second state a deadtime after Q6 transitions from the first state to the second state.

In the interval 204, Q5 transitions at a falling edge from the second state to the first state a deadtime after QB1 transitions at a falling edge from the first state to the second state, and QT1 transitions at a rising edge from the first state to the second state a deadtime after Q5 transitions from the second state to the first state.

In the interval 206, Q5 transitions at a rising edge from the first state to the second state a deadtime after QB2 transitions at a falling edge from the second state to the first state, and QT2 transitions at a rising edge from the first state to the second state a deadtime after Q5 transitions from the first state to the second state.

In the interval 208, Q6 transitions at a falling edge from the second state to the first state a deadtime after QT1 transitions at a falling edge from the second state to the first state, and QB1 transitions at a rising edge from the second state to the first state a deadtime after Q5 transitions from the second state to the first state.

The controller 128 may select the duration of the deadtimes based on a load current flowing through the load resistor 132 to provide soft switching or reduce switching loss. For example, the deadtimes between the upper switches (transistors 102 and 106) and the lower switches (transistors 104 and 108) of the full bridge may be dynamically selected based on load current to provide zero voltage switching. Similarly, the deadtimes between the switches of the full-bridge and the synchronous rectifiers (transistors 122 and

124) may be selected to reduce the body conduction time and reverse recovery current of the body diodes of the transistors 122 and 124.

In some implementations of the phase shift full bridge converter circuit 100, the controller 128 may select the deadtimes based on an average current value sensed on the secondary side of the transformer 116. However, secondary side current sensing circuitry, and digitization of the output of the current sensing circuitry introduces delay in deadtime determination, which can reduce the accuracy of the applied deadtime relative to the actual load current. Additionally, calculation of deadtimes based on average current uses complex mathematical operations that introduce further delay and consume significant processor cycles.

The controller 128 generates deadtime values based on a compensation value produced by the controller 128. The compensation value is based on the voltage at VOUT and used by the controller 128 to control pulse width modulation. By generating deadtime values based on the compensation value, the controller 128 can avoid secondary side current sensing circuitry and the deadtime generation delays associated therewith. Additionally, the processor cycles needed to generate the deadtime values based on the compensation value are greatly reduced relative to deadtime generation based on average current.

Figure 3:
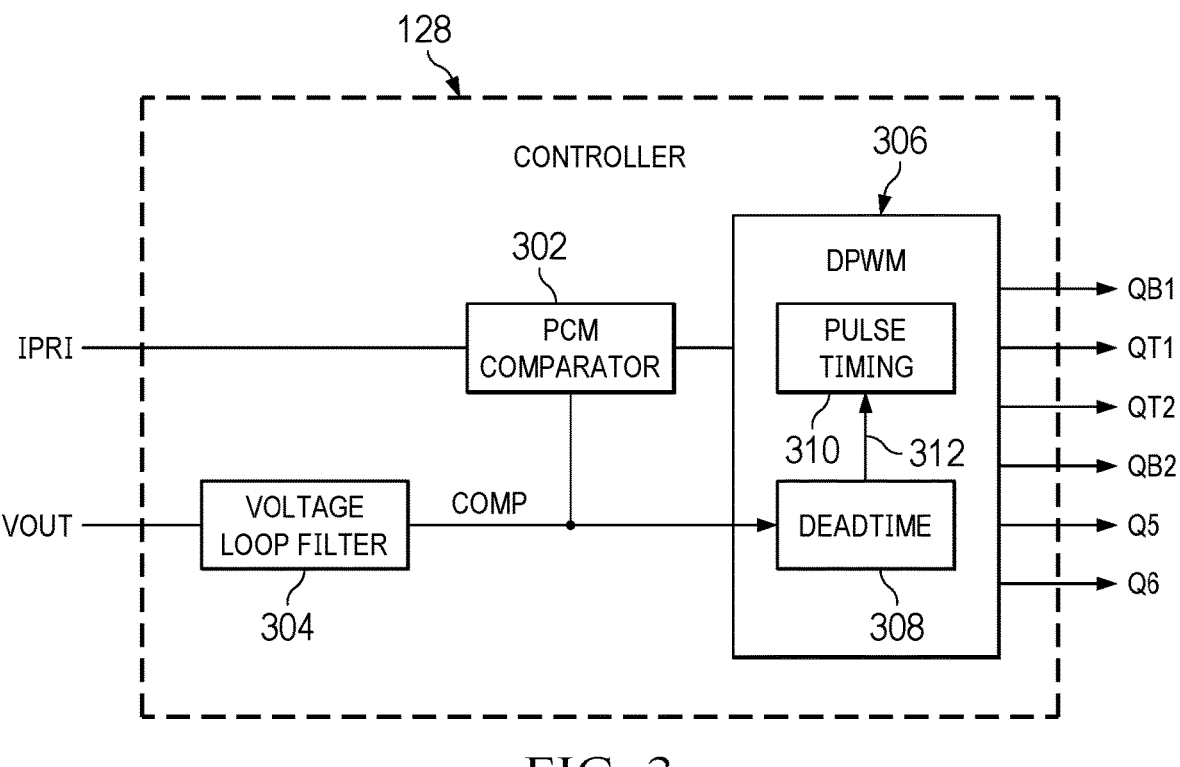
FIG. 3 is a block diagram of an example controller suitable for use in the phase shift full bridge converter circuit of FIG. 1.

FIG. 3 is a block diagram of an example controller 128 suitable for use in the phase shift full bridge converter circuit 100. The controller 128 includes a peak current mode (PCM) comparator 302, a voltage loop filter 304, and a digital pulse width modulator (DPWM) circuit 306. The voltage loop filter 304 may perform a proportional-integral-differential (PID) algorithm to generate the compensation value (COMP) based on VOUT. The voltage loop filter 304 provides COMP to the PCM comparator 302 and the DPWM circuit 306. The PCM comparator 302 may include a digital or analog comparator that compares COMP to the current IPRI flowing through the primary coil of the transformer 116. Output of the PCM comparator 302 is provided to the DPWM circuit 306 to control generation of the transistor control signals QT1, QB1, QB2, QT2, Q5, and Q6. The DPWM circuit 306 includes a deadtime circuit 308 and a pulse timing circuit 310. The deadtime circuit 308 generates deadtime values 312 based on COMP, and provides the deadtime values 312 to the pulse timing circuit 310. The pulse timing circuit 310 applies the deadtime values 312 to control the transition timing of the transistor control signals QT1, QB1, QB2, QT2, Q5, and Q6.

Figure 4:
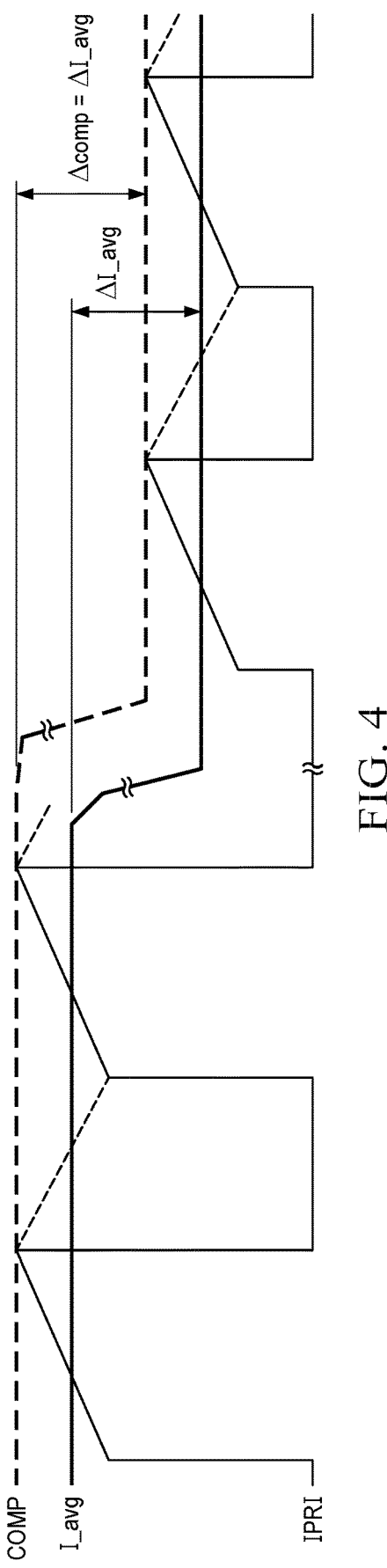
FIG. 4 is a graph of example current and compensation signals in the controller of FIG. 3.

FIG. 4 is a graph of example current and compensation values in the controller 128. FIG. 4 shows IPRI, COMP, and average load current (I_AVG). FIG. 4 shows that COMP determines the maximum value of IPRI by operation of the PCM comparator 302.

FIG. 4 also shows that the difference in COMP over a range of load currents is the same (ΔI_AVG) as the difference in I_AVG over the range of load currents. Accordingly, COMP can be used in the controller 128 to determine deadtime values with results similar to use of I_AVG in other implementations, while reducing delay and complexity.

Figure 5:
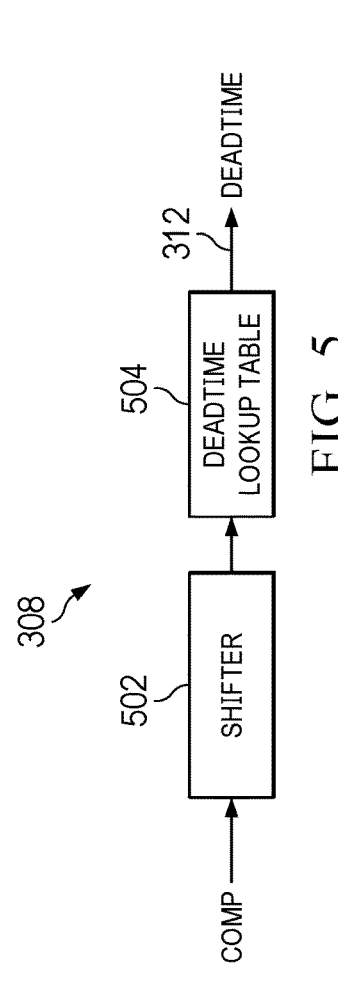
FIG. 5 is a block diagram of an example deadtime circuit suitable for use in the controller of FIG. 3.

FIG. 5 is a block diagram of an example deadtime circuit 308. The deadtime circuit 308 includes a shifter circuit 502 and a deadtime lookup table 504. The deadtime circuit 308 may be implemented in a processor or as dedicated circuitry. For example, the shifter circuit 502 may be implemented as part of an arithmetic logic unit of a processor, and the deadtime lookup table 504 may be provided as deadtime values stored in memory of the processor. The shifter circuit 502 may be configured to right-shift COMP by a number of bits selected to position higher significance bits of COMP for use in indexing the deadtime lookup table. For example, the shifter circuit 502 produce a shifted compensation value by right shifting COMP by nine bits in some implementations. Table 1 below illustrates an example deadtime lookup table 504 that includes 32 deadtime values addressable by a 5 bit index derived from COMP. The index may be derived by right shifting COMP by 9 bits in some implementations of the deadtime circuit 308. The deadtime values provided in Table 1 may be selected to increase the efficiency of the phase shift full bridge converter circuit 100.

TABLE 1

| Index | Deadtime |
|---|---|
| 0 | 680 |
| 1 | 680 |
| 2 | 680 |
| 3 | 680 |
| 4 | 510 |
| 5 | 510 |
| 6 | 230 |
| 7 | 230 |
| 8 | 170 |
| 9 | 170 |
| 10 | 170 |
| 11 | 170 |
| 12 | 170 |
| 13 | 170 |
| 14 | 170 |
| 15 | 170 |
| 16 | 170 |
| 17 | 170 |
| 18 | 170 |
| 19 | 170 |
| 20 | 170 |
| 21 | 170 |
| 22 | 170 |
| 23 | 170 |
| 24 | 170 |
| 25 | 170 |
| 26 | 170 |
| 27 | 170 |
| 28 | 170 |
| 29 | 170 |
| 30 | 170 |
| 31 | 170 |

Figure 6:
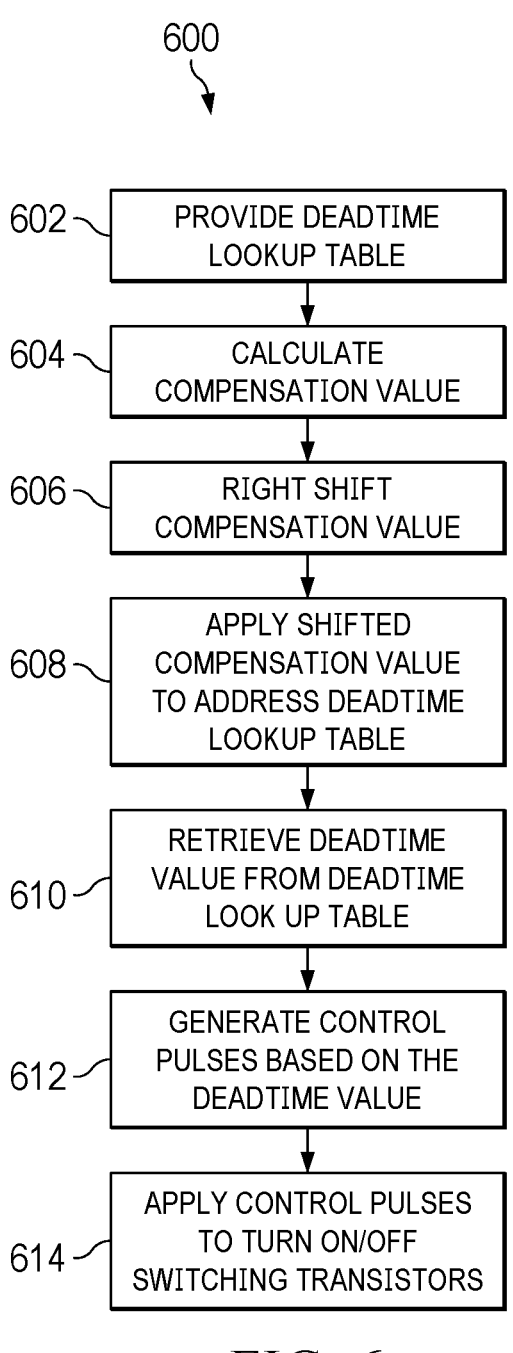
FIG. 6 is a flow diagram of an example method for selecting deadtime values in a switching converter.

FIG. 6 is a flow diagram of an example method 600 for determining deadtime values in the phase shift full bridge converter circuit 100. Though depicted sequentially as a matter of convenience, at least some of the illustrated operations can be performed in a different order and/or performed in parallel. Additionally, some implementations may perform only some of the operations illustrated. At least some operations of the method 600 may be performed by the controller 128.

In block 602, the deadtime lookup table 504 is provided in the controller 128. The deadtime lookup table 504 may include values as shown in Table 1 in some implementations. The deadtime lookup table 504 may be provided in a memory that can be accessed by a processor of the phase shift full bridge converter circuit 100, or may be provided in a data storage device that is coupled to the shifter circuit 502.

In block 604, the compensation value COMP is calculated by the voltage loop filter 304. The voltage loop filter 304 may calculate COMP using a PID algorithm. The voltage loop filter 304 provides COMP to the PCM comparator 302 and the deadtime circuit 308. The PCM comparator 302 compares COMP to IPRI to control the pulse timing of transistor control signals QT1, QB1, QB2, QT2, Q5, and Q6.

In block 606, the deadtime circuit 308 selects a portion (e.g., selected bits) of COMP to be used to index the deadtime lookup table 504. In some examples of the deadtime circuit 308, the shifter circuit 502 may right shift COMP by a selected number of bits (e.g., 9 bits) to produce an index value for accessing the deadtime lookup table 504.

In block 608, the deadtime circuit 308 applies the index value produced in block 606 to address the deadtime lookup table 504, and retrieves a deadtime value from the deadtime lookup table 504 in block 610.

In block 612, the deadtime circuit 308 provides the deadtime value retrieved in block 610 to the pulse timing circuit 310. The pulse timing circuit 310 generates control pulses based on the deadtime value. The control pulses are pulses of the transistor control signals QT1, QB1, QB2, QT2, Q5, and Q6 as shown in FIG. 2.

In block 614, the controller 128 applies the transistor control signals QT1, QB1, QB2, QT2, Q5, and Q6 to turn the transistors 102, 104, 106, 108, 122, and 124 on or off.

While deadtime value determination based on COMP has been described herein in the context of the phase shift full bridge converter circuit 100, examples of the deadtime circuit 308 may be implemented in various other types of switching converters, including buck converters, buck-boost converters, hard switching full bridge converters, hard switching half bridge converters, LLC converters, inverting buck-boost converters, and other types of switching converters.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

As used herein, the terms "terminal," "node," "interconnection," "pin" and "lead" are used interchangeably. Unless specifically stated to the contrary, these terms are generally used to mean an interconnection between or a terminus of a device element, a circuit element, an integrated circuit, a device or other electronics or semiconductor component.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead with little or no change to the remaining circuitry. For example, a field effect transistor ("FET") (such as an n-channel FET (NFET) (n-type transistor) or a p-channel FET (PFET) (p-type transistor)), a bipolar junction transistor (BJT—e.g., NPN transistor or PNP transistor), an insulated gate bipolar transistor (IGBT), and/or a junction field effect transistor (JFET) may be used in place of or in conjunction with the devices described herein. The transistors may be depletion mode devices, drain-extended devices, enhancement mode devices, natural transistors, or other types of device structure transistors. Furthermore, the devices may be implemented in/over a silicon substrate (Si), a silicon carbide substrate (SiC), a gallium nitride substrate (GaN) or a gallium arsenide substrate (GaAs).

References may be made in the claims to a transistor's control input and its current terminals. In the context of a FET, the control input (or transistor control terminal) is the gate, and the current terminals are the drain and source. In the context of a BJT, the control input is the base, and the current terminals are the collector and emitter.

References herein to a FET being "ON" means that the conduction channel of the FET is present and drain current may flow through the FET. References herein to a FET being "OFF" means that the conduction channel is not present so drain current does not flow through the FET. An "OFF" FET, however, may have current flowing through the transistor's body-diode.

Circuits described herein are reconfigurable to include additional or different components to provide functionality at least partially similar to functionality available prior to the component replacement. Components shown as resistors, unless otherwise stated, are generally representative of any one or more elements coupled in series and/or parallel to provide an amount of impedance represented by the resistor shown. For example, a resistor or capacitor shown and described herein as a single component may instead be multiple resistors or capacitors, respectively, coupled in parallel between the same nodes. For example, a resistor or capacitor shown and described herein as a single component may instead be multiple resistors or capacitors, respectively, coupled in series between the same two nodes as the single resistor or capacitor.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. In this description, unless otherwise stated, "about," "approximately" or "substantially" preceding a parameter means being within +/−10 percent of that parameter or, if the parameter is zero, a reasonable range of values around zero.

Modifications are possible in the described embodiments, and other embodiments are possible, within the scope of the claims.

What is claimed is:

1. A circuit comprising:
   a controller configured to control switching of a first transistor and a second transistor in a switching converter, the controller including:

a compensation loop including a voltage loop filter configured to provide a compensation value based on an output voltage of the switching converter; and
   a deadtime circuit configured to determine a deadtime value based on the compensation value, the deadtime value defining an interval between turn-off of the first transistor and turn-on of the second transistor.

2. The circuit of claim 1, wherein the deadtime circuit includes a lookup table storing the deadtime value, and the deadtime circuit is configured to retrieve the deadtime value from the lookup table based on the compensation value.

3. The circuit of claim 2, wherein the deadtime circuit includes a shifter circuit configured to right-shift the compensation value by a selected number of bits to produce a shifted compensation value.

4. The circuit of claim 3, wherein the deadtime circuit is configured to apply the shifted compensation value to select the deadtime value stored in the lookup table.

5. The circuit of claim 3, wherein the selected number of bits is nine.

6. The circuit of claim 1, wherein the first transistor is coupled between a power terminal and a switching node, and the second transistor is coupled between the switching node and a reference voltage terminal.

7. The circuit of claim 1, wherein the controller is configured to delay turn-on of the second transistor, by a time represented by the deadtime value, after turn-off of the first transistor.

8. A method, comprising:
   calculating a compensation value based on an output voltage of a switching converter by a voltage loop filter of a compensation loop of the switching converter;
   selecting a deadtime value based on the compensation value, the deadtime value defining an interval between turn-off of a first transistor and turn-on of a second transistor of the switching converter; and
   applying the deadtime value to control switching of the first transistor and the second transistor.

9. The method of claim 8, further comprising storing the deadtime value in a lookup table of a controller of the switching converter.

10. The method of claim 8, further comprising retrieving the deadtime value from a lookup table of a controller of the switching converter.

11. The method of claim 10, further comprising right shifting, by the controller, the compensation value to produce a shifted compensation value.

12. The method of claim 11, further comprising applying the shifted compensation value to access the deadtime value stored in the lookup table.

13. The method of claim 11, wherein the compensation value is right shifted by nine bits.

14. The method of claim 8, further comprising:
   turning off the first transistor;
   delaying by a time defined by the deadtime value; and
   turning on the second transistor after expiration.

15. A switching converter comprising:
   a first transistor and a second transistor coupled in series;
   a controller coupled to the first transistor and the second transistor, the controller including:
      a compensation loop including a voltage loop filter coupled to a voltage output terminal of the switching converter, the voltage loop filter configured to provide a compensation value based on an output voltage of the switching converter provided at the voltage output terminal; and a deadtime circuit configured to determine a deadtime value based on the compensation value, the deadtime value defining an interval between turn-off of the first transistor and turn-on of the second transistor.

16. The switching converter of claim 15, wherein the deadtime circuit includes a lookup table storing the deadtime value, and the deadtime circuit is configured to retrieve the deadtime value from the lookup table based on the compensation value.

17. The switching converter of claim 16, wherein the deadtime circuit includes a shifter circuit configured to right-shift the compensation value by a selected number of bits to produce a shifted compensation value.

18. The switching converter of claim 17, wherein the deadtime circuit is configured to apply the shifted compensation value to select the deadtime value stored in the lookup table.

19. The switching converter of claim 17, wherein the selected number of bits is nine.

20. The switching converter of claim 15, wherein the first transistor is coupled between a power terminal and a switching node, and the second transistor is coupled between the switching node and a reference voltage terminal.

* * * * *